United States Patent [19]

DiGianvittorio

[11] Patent Number: 4,492,215

[45] Date of Patent: Jan. 8, 1985

[54] OUTDOOR PORTABLE CHARCOAL GAS GRILL

[76] Inventor: Fiorindo DiGianvittorio, 62 Webster St., East Boston, Mass. 02128

[21] Appl. No.: 595,657

[22] Filed: Apr. 2, 1984

[51] Int. Cl.³ .......................... F24C 1/16; B65D 6/12; F16M 11/32

[52] U.S. Cl. ................... 126/9 R; 126/25 R; 220/4 F; 248/165; 16/260

[58] Field of Search ............... 126/9 R, 9 A, 9 B, 29, 126/30, 38, 25 R; 248/165; 220/4 F, 76, 77, 408; 16/254, 260, 263, 265, 270; 99/340, 449

[56] References Cited

U.S. PATENT DOCUMENTS

| | | | |
|---|---|---|---|
| 1,617,806 | 2/1927 | Hanson | 126/38 |
| 1,701,879 | 2/1929 | Goldberg | 126/9 R |
| 1,785,143 | 3/1929 | Oonk | 126/9 R |
| 2,119,799 | 6/1938 | Sivey | 126/9 R |
| 2,515,521 | 7/1950 | Loffredo | 126/9 R |
| 2,669,117 | 2/1954 | Furmann | 126/30 |
| 2,965,097 | 12/1960 | Clark | 126/9 R |
| 3,447,530 | 6/1969 | Sanjeramo | 126/9 R |
| 3,880,139 | 4/1975 | Young | 126/9 R |
| 3,899,961 | 8/1975 | Tanguy | 126/38 |

Primary Examiner—James C. Yeung
Assistant Examiner—G. Anderson
Attorney, Agent, or Firm—Joseph S. Iandiorio; William E. Noonan

[57] ABSTRACT

A portable grill is provided which includes a housing having a base for supporting a burner therein, a pair of spaced apart front and rear walls, a pair of spaced apart side walls, and a cover. Each wall in each pair of walls releasably interlocks with each associated wall of the other pair of walls. At least one of the walls is detachably mountable to the base. The cover is hingeably attachable to one of the walls when that wall is erected on the base and is hingeably attachable to the base when the walls are detached from the base to form a portable housing. A collapsible stand may also be provided for supporting the erected grill housing.

28 Claims, 4 Drawing Figures

OUTDOOR PORTABLE CHARCOAL GAS GRILL

FIELD OF INVENTION

This invention relates to a portable outdoor grill.

BACKGROUND OF INVENTION

Outdoor gas and charcoal grills are very popular devices and it is very often highly desirable that such grills be portable. For example, outdoor grills are most frequently used during warm weather seasons, and it is often necessary or advantageous to disassemble and/or store the device when it is not in use, such as during the winter months. Even during the "barbecuing season" it may often be desirable to store the grill between uses or to transport the apparatus to outings, cookouts, camping sites, etc.

Disassembly, reassembly, storage and transportation of outdoor grills of the prior art is very inconvenient. Many grills are large and cumbersome, makes them difficult to transport, particularly in a compact car. Storage is also a problem. Many outdoor grills take up an undesirably large amount of garage, basement or closet space. Additionally, many grills employ numerous attachment pieces, such as bolts, screws and nuts. Disassembling and reassembling the apparatus is time consuming, tedious, and may require screw drivers, wrenches and other tools. The danger also exists of losing a screw or nut.

Furthermore, because many outdoor grills are either difficult or impossible to disassemble, complete and effective cleaning of the grill may be hindered or may be neglected altogether.

SUMMARY OF INVENTION

It is therefore an object of this invention to provide an improved portable outdoor grill which may be quickly and simply assembled and disassembled to enable compact and convenient transportation and storage of the grill.

It is a further object of this invention to provide a portable outdoor grill which may be quickly, simply and completely disassembled to enable convenient and complete cleaning thereof.

It is a further object of this invention to provide a portable outdoor grill which may be assembled or disassembled by hand without screws, bolts, nuts or similar means of attachment.

It is a further object of this invention to provide a portable outdoor grill which may be employed in gas, charcoal or other types of outdoor grill applications.

This invention features, in a portable outdoor grill, a collapsible housing for accommodating a burner and including a base for supporting the burner thereon. There are a pair of spaced apart front and rear walls and a pair of spaced apart side walls. Each wall and each pair of walls includes means for releasably interlocking with complementary means on associated walls of the other pair of walls. There are means for detachably mounting at least one of the walls to the base. A cover is provided. There are first hinge means carried by one of the walls, second hinge means carried by the base, and third hinge means carried by the cover for engaging the first hinge means to permit hinge detachment of the cover to the wall when the wall is erected on the base and for engaging the second hinge means to permit hinged attachment of the cover to the base when the walls are detached from the base to form a portable housing for the walls.

In a preferred embodiment, the means for releasably interlocking may include recess means disposed in the wall and the complementary means may include and insertion portion of the associated wall which is interlockably receivable by the recess means. Alternatively, one of the means for releasably interlocking and complementary means may include a recess in one of the walls and the other may include an insertion portion of the other wall which is receivable by the recess means. Each wall may include a pair of insertion portions and a pair of recess means proximate opposite ends of the wall for receiving respective insertion portions of the associated wall. The means for releasably interlocking may also include channel means carried by one of the walls and the complementary means may include a section of the associated wall which is slidably insertible in the channel means. The means for detaching may include at least one pin carried by the wall and at least one complementary aperture disposed in the base. Each aperture receives a complementary pin. At least one pair of opposite walls may include means for supporting the one or more racks within the erected walls.

The housing may further include latch means for latching the cover in a closed condition to the base. A handle may be mounted to the outside of the cover for permitting the cover to be hingeably opened and closed and for enabling carrying of the portable housing when the cover is closed and latched to the base. At least one of the base and the walls may include an opening for disposing a fuel conduit therethrough.

This invention also features a portable grill which includes a collapsible housing as disclosed above and a collapsible stand, including a plurality of legs and collapsible brace means for interconnecting each pair of adjacent legs. The stand is selectively erected for supporting the housing thereon and collapsed for storage thereof. Means are provide for detachably fixing the housing on the legs when the stand is erected. The stand may include four legs. The grill may further include receptacle means disposed at the upper end of each leg and having a bore which is alignable with an associated aperture of the base to receive the wall pin, which is inserted through the aperture.

Additionally featured by this invention is a portable outdoor gas grill which includes the housing and collapsible stand heretofore disclosed and burner means accommodated within the housing. Conduit means may also be disposed through the opening in the base or walls for introducing fuel into the burner means.

DISCLOSURE OF PREFERRED EMBODIMENT

Other objects, features and advantages will occur from the following description of a preferred embodiment and the accompanying drawings, in which.

Figure 1:
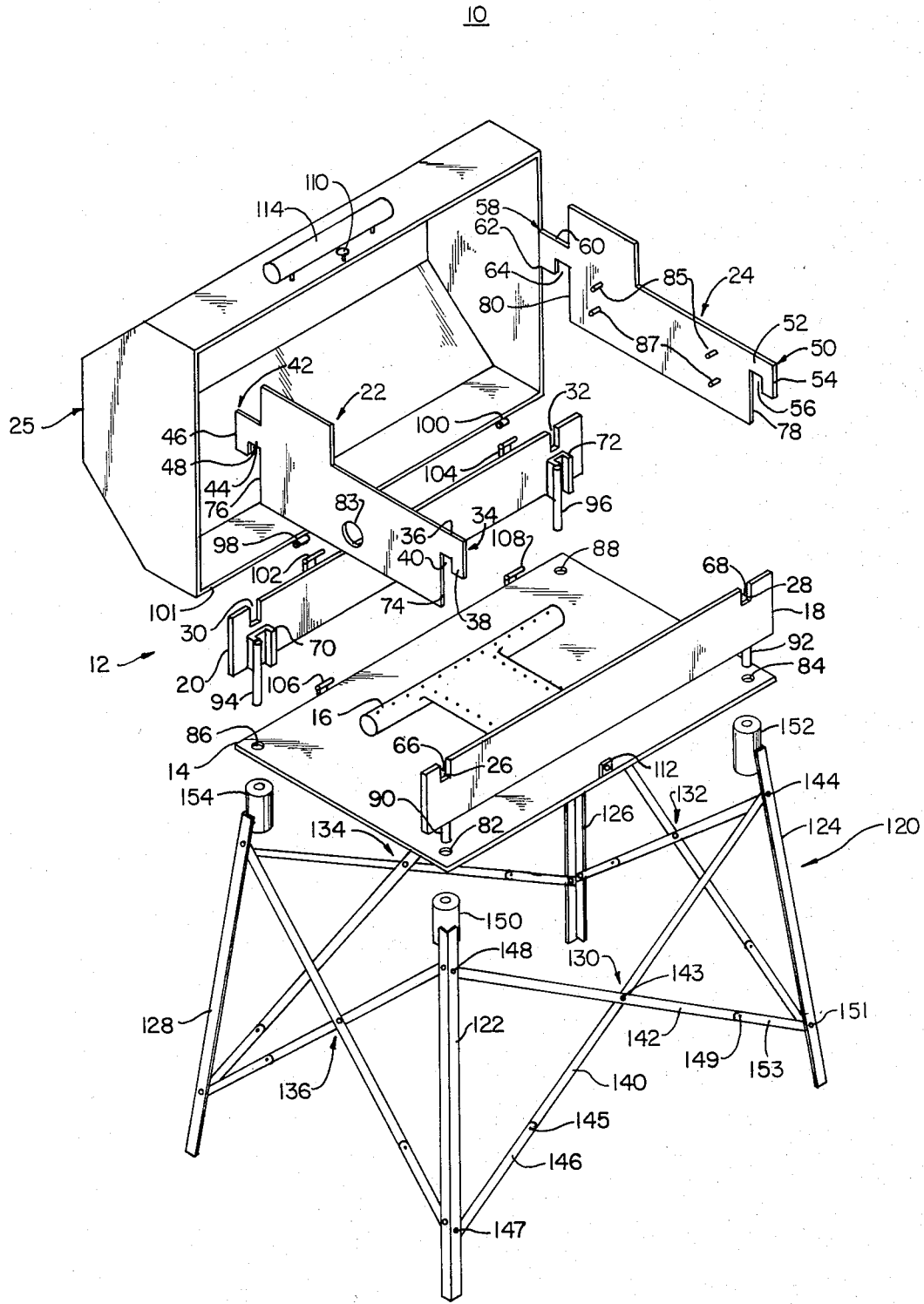
FIG. 1 is an exploded axonometric view of a portable outdoor grill according to this invention.

An improved portable outdoor grill according to this invention may be effected using a collapsible housing or firebox. A base supports the grill burner, which may be a gas, charcoal, or any other acceptable type of burner.

The housing also includes a spaced-apart pair of front and rear walls and a pair of spaced-apart side walls. Each wall includes means for releasably interlocking with complementary means on associated walls of the other pair of walls. For example, each of the walls of one pair, e.g. the front and rear pair, may include a pair of recess means disosed therein proximate opposite ends of each wall, and each of the walls of the other, e.g. side pair, may include a pair of complementary insertion portions again disposed proximate opposite ends of the wall. One of the insertion portions is received by a front wall recess and the other by a rear wall recess. Typically, each of the four walls includes a pair of recesses and a pair of insertion portions. Additionally, channel means may be carried by each of the walls of one pair of walls, for example the front and rear pair, and in such instances opposing pairs of channel means slideably receive the ends of each of the walls of the other pair of walls to enhance the interlocking fit.

There are means for detachably mounting at least one of the walls to the base. Typically, the front and rear pairs of walls each carries a pair of pins which extend from the bottom edge thereof and which are receivable by complementary apertures disposed in the base.

At least one of the pairs of walls may include means for supporting one or more racks within the housing. Such means for supporting may include lugs or lips which are mounted to, and extend from, for example, the inside surfaces of the side walls. Alternatively, holes may be provided in the opposing pair of walls so that extended rack wires may be inserted therein.

Construction of the housing in the above manner eliminates the need for bolts, nuts and screws for interconnecting the walls and base. Assembly and disassembly are thus greatly simplified and accelerated. The housing may also be taken apart rapidly and completely so that the inside of the grill may be thoroughly cleaned.

A cover is provided which is hingeably attachable to either one of the walls or the base. When the walls are erected the cover is secured to one of them so that the grill may be covered during cooking. Alternatively, when the walls are detached from the base the cover is hingeably secured to the base to form a portable housing within which the detached walls may be stored.

Latch means may be provided for latching the cover in a closed condition to the base. A handle may be mounted to the outside of the cover so that the cover can be hingeably raised and lowered and so that the portable housing may be carried when the cover is closed and latched to the base.

A collapsible stand is provided for supporting the housing. The stand includes a plurality of (typically four) legs and collapsible brace means for interconnecting each pair of adjacent legs. The brace means typically includes crossing and pivotably interconnected brace elements. Various other brace elements which afford interconnection of the legs and compact collapsability may also be used.

The housing is detachably fixed to the erected stand. Receptacle means may be mounted at the upper end of each leg. Alternatively, such a receptacle may be integral with the leg. Each such receptacle has a bore which is alignable with an associated aperture of the base so that the wall pin which is inserted through the aperture may be received in the bore.

It is preferred that the portable grill of this invention be employed in gas burner applications, although it can be utilized as a charcoal or other type of grill. In gas grill applications, a standard gas fuel tank may be disposed beneath the base within the erected stand and may be interconnected by a pipe, hose or other type of conduit through an inlet to the burner. A hole may be disposed in either the base or one of the walls so that such a conduit is accessible to the burner.

It is preferred that the housing elements, e.g. walls, base and cover, be constructed of relatively light weight but heat resistant metals or metal alloys suitable for grill applications.

The construction of this invention enables the device to be collapsed into a very compact condition. The provision of the handle equipped cover which attaches directly to the base provides a suitcase-like structure which is extremely useful for storing and transporting the walls and burner of the device. The collapsible housing and stand enable the grill to be assembled and disassembled by hand very quickly and allow the grill to be transported conveniently to outing, camping and cookout sites, and even aboard boats. The grill may be conveniently stored in a very small space when not in use and may be readily transported, even in small vehicles such as compact cars.

There is shown in FIG. 1 a portable outdoor grill 10 which features a collapsible fire box or housing 12. This housing includes a base 14 for supporting a burner 16, a pair of front and rear walls 18, 20, a pair of spaced-apart side walls 22 and 24, and cover 25. The four walls are releasably interlocked together and are detachably mounted to the base according to the following construction.

Front wall 18 includes a pair of recesses 26 and 28 in the top edge and proximate opposite ends thereof. Rear wall 20 includes similar recesses 30 and 32. Side wall 22 includes an integral extension portion 34, which comprises an insertion portion 36 and an overlapping portion 38. Extension portion 34 thereby defines a recess 40 proximate the forward end of wall 22. Similarly, wall 22 includes a rearward extension section 42, comprising an insertion portion 44 and overlapping portion 46 which define a recess 48. Integral L-shaped extension portion 50 of side wall 24 includes an insertion portion 52 and an overlapping portion 54 to thereby define a recess 56. A similar extension portion 58 extends from the rearward end of wall 24 and includes an insertion portion 60 and overlapping portion 62 which define a recess 64.

Front wall 18 also includes a pair of channel members 66 and 68 which are mounted to the inside surface of the wall imxediately below recesses 26 and 28, respectively. Rear wall 20 includes similar channel members 70 and 72 disposed immediately below recesses 30 and 32 on the inside surface of the wall. Wall 22 includes receivable portions 74 and 76, which are slidably receivable in respective front and rear channels 66 and 70, and wall 24 includes receivable portions 78 and 80, which are similarly receivable in respective channels 68 and 72.

Base 14 includes four apertures 82, 84, 86 and 88, which are disposed at the four corners of the base and which extend completely therethrough. Front wall 18 carries a pair of pins 90 and 92, which depend from the bottom thereof and which are spaced apart a distance equal to the distance between base apertures 82 and 84. A similar pair of pins 94 and 96 depend from the bottom edge of rear wall 20 and are spaced apart a distance equal to the distance between base apertures 86 and 88.

Each of the pins is slidably receivable through a respective aperture.

To assemble the housing, the front and rear walls 18 and 20 are mounted to base 14. Pins 90 and 92 of wall 18 are inserted in base apertures 82 and 84, and pins 94 and 96 of wall 20 are inserted in apertures 86 and 88.

Side walls 22 is releasably interlocked to both walls 18 and 20. Receivable portions 74 and 76 of wall 22 are fitted into respective channels 66 and 70 of walls 18 and 20. Insertion portions 36 and 44 of wall 22 are thereby inserted into respective front and rear wall recesses 26 and 30. At the same time, recess 40 of wall 22 receives those portions of front wall 18 and channel member 66, which are immediately below recess 26, and side wall recess 48 receives those portions of rear wall 20 and channel member 70 which are immediately below rear wall recess 30.

Side wall 24 is likewise releasably interlocked to both front wall 18 and rear wall 20. Receivable portion 78 is slidably received by channel 68 and receivable portion 80 is similarly received by channel 72. Insertion portion 52 of side wall 24 is received by front wall recess 28 and insertion portion 60 is received by rear wall recess 32. At the same time, side wall recess 56 receives those portions of the front wall 18 and front channel member 68 which are immediately below recess 28. Side wall recess 64 likewise receives those portions of rear wall 20 and rear channel member 72 which are immediately below recess 32. When this construction is completed, the four walls are firmly and releasably interlocked and will not slide sideways relative to each other.

Side wall 22 is provided with an opening 83 for accommodating a conduit between the fuel tank, omitted in FIG. 1, and burner 16. Means such as lugs 85 are provided on the inside surfaces of walls 24 and 22 for supporting an upper rack within the housing. Similar lugs 87 may be included on the opposing walls 22 and 24 for supporting a lower rack within the housing.

Figure 3:
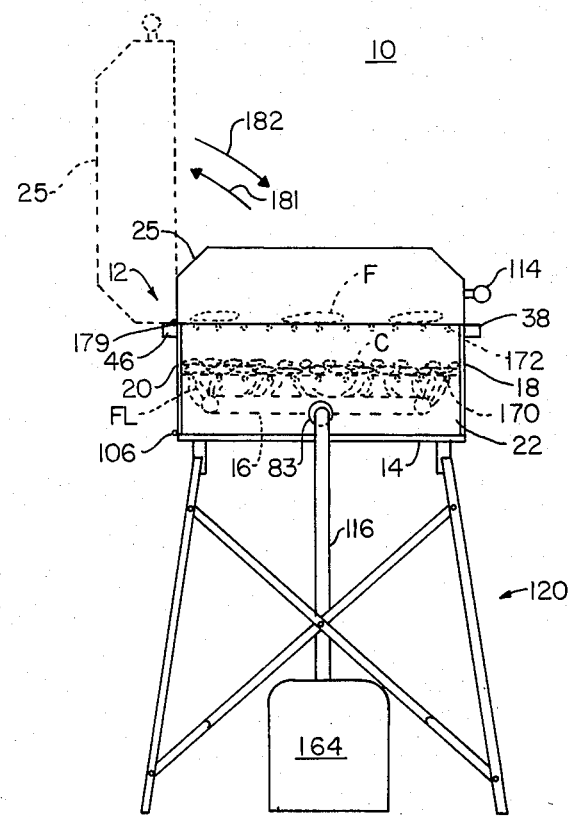
FIG. 3 is a side elevational view of the portable grill erected and in operation.

Cover 25 may be selectively attached to either the upper edge of rear wall 20 or to base 14. Cover 25 includes a pair of spaced apart hinge elements 98 and 100 on the rear edge 101 thereof. Rear wall 20 includes a complementary pair of spaced apart hinge elements 102 and 104 along the top edge thereof. When the walls are erected as described above, cover 25 is pivotably attached thereto by engaging hinge elements 98 and 100 with respective hinge elements 102 and 104. Cover 25 may thus be pivoted between an open condition, as shown in FIG. 1, and a closed condition, as shown in FIG. 3. Spaced-apart hinge elements 106 and 108 are also provided along the rear edge of base 14 so that when the housing is disassembled cover hinge elements 98, 100 may engage base hinge elements 106, 108. The cover thus may be directly and pivotably attached to the base to provide a portable housing 109, FIG. 4.

Cover 25 includes a latch element 110, FIG. 1, on the front thereof for engaging a complementary latch element 112 carried by base 14 when the walls are disassembled, and cover 25 is attached directly to base 14. The cover also includes a handle 114 mounted to the front thereof for enabling opening and closing of the cover and carrying the portable housing 109 of FIG. 4.

As shown in FIG. 1, housing 12 is mounted on a collapsible stand 120, which includes four legs 122, 124, 126 and 128. Each leg comprises an elongate element having an L-shaped cross section. Adjacent pairs of legs are collapsibly interconnected by brace means 130, 132, 134 and 136. For example, collapsible brace means 130 includes a pair of longitudinal brace elements 140, 142, which are pivotably connected at 143. Element 140 is itself connected at one end by a pivot 144 to leg 124 and at the other end by a pivot 145 to a short element 146. The other end of short element 146 is connected at pivot 147 to leg 122. Similarly, one end of longitudinal element 142 is pivotably connected at one end at 148 to leg 122 and is pivotably connected at the other end at pivot 149 to a short element 150. Short element 153 is itself connected at its other end by a pivot 151 to leg 124.

To detachably mount stand 120 to housing 12, respective receptacle bushings 150, 152, 154 are provided at the top end of each leg. A bushing at the top of leg 126 is not visible. Each bushing is mounted to the inside of a respective L-shaped leg by welding, soldering or clamping in any acceptable manner. When stand 120 is opened, the bore of each bushing aligns with a respective base aperture and thereby receives the pin which is inserted through that aperture. For example, receptacle 150 at the top of leg 122 receives pin 90 which extends through aperture 82.

Figure 2:
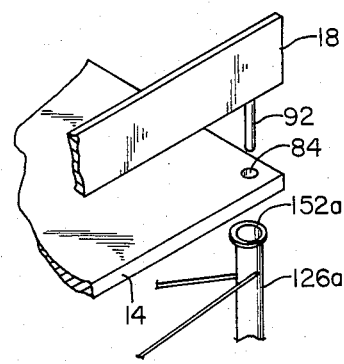
FIG. 2 is a partial axonometric exploded view of an alternative preferred leg used by the collapsible stand.

Alternatively, as shown in FIG. 2, the legs, such as leg 126a, may be tubular, and each may include an integral receptacle 152a at the top end thereof. Then, for example, pin 92 of front wall 18 is inserted through base aperture 84 and into aperture 152a at the top of leg 126a. Each of the remaining legs of this embodiment is similarly constructed to receive a respective wall pin. This construction eliminates the necessity of attaching a separate receptacle bushing to the leg.

Construction of stand 120 according to either of the above embodiments provides sturdy and dependable support for the housing over repeated use. Stand 120 may also be erected quickly and may be collapsed both rapidly and compactly.

FIG. 3 illustrates grill 10 fully erected and in operation. Gas fuel supply 164 is disposed within the opened stand 120. A conduit 166 is interconnected between supply 164 and burner 16 and extends through opening 87 in side wall 22.

Within housing 12, a lower rack 170 is supported by the upper set of opposing lower set of lugs, not shown in FIG. 3, on the side walls. In turn, rack 170 supports coals C. Upper rack 172 is held by the upper set of opposing lugs, again not shown in FIG. 3, on the side walls, and food F is supported by this rack.

Burner 16 is lit in a conventional fashion to produce a flame FL. This causes coals C on rack 170 to be heated and ignite, thereby cooking food F. Cover 25 is shown closed during cooking. The cover may periodically be opened and closed by grasping handle 114 and pivoting the cover about hinges 179 in the direction of arrows 180 and 182. Cover 25 is enabled to stand upright by itself by resting upon the overlapping portions 46 and 62 (obscured) of side walls 22 and 24. The front overlapping portion 38 of side wall 22 is also evident in FIG. 3.

Grill 10 is disassembled simply by removing racks 172 and 170 and reversing the procedure described in FIG. 1: first cover 25 is removed from rear wall 20 by disengaging hinge elements 98 and 100 from hinge elements 102 and 104. Side walls 22 and 24 are lifted upwardly and thereby detached from front and rear walls 18 and 20. The front and rear walls are themselves disassembled by removing the base pins 90, 92, 94 and 96 from their respective base apertures and leg receptacles.

Conduit 166 may then be detached from burner 16 and stored with fuel tank 164. In this disassembled condition the grill may be thoroughly cleaned and then either reassembled or completely collapsed for transportation and/or storage.

Figure 4:
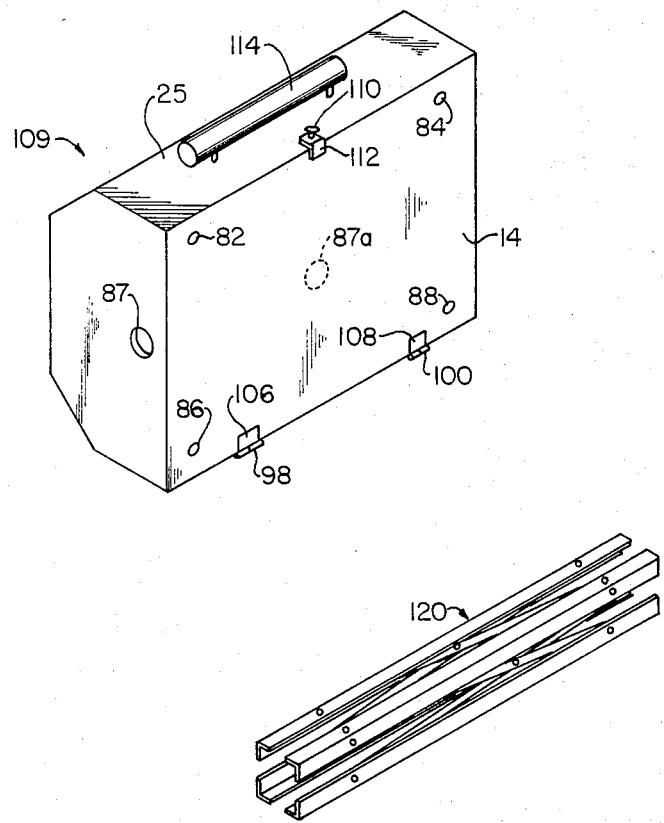
FIG. 4 is an axonometric view of the grill in a collapsed condition ready for transportation and/or storage.

To transport and/or store grill 10, the four walls are neatly stacked with the burner on base 14. Cover hinge elements 98 and 100 are pivotably engaged to base hinge elements 106 and 108, as shown in FIG. 4. Base latch element 112 is then secured to latch element 110 carried by cover 25 to provide a portable housing 109, which may readily and conveniently carried by handle 114. As further shown in FIG. 4, an opening 87a for passing a fuel conduit therethrough may optionally be provided in base 14 rather than in one of the walls.

Disassembly of grill 10 is completed simply by collapsing stand 120 into a condition, shown in FIG. 4, which enables convenient and compact storage of the stand.

Other embodiments will occur to those skilled in the art and are within the following claims:

What is claimed is:

1. In a portable outdoor grill a collapsible housing for accommodating a burner, comprising:
   a base for supporting the burner thereon;
   a pair of spaced apart front and rear walls;
   a pair of spaced apart side walls; each wall in each pair of walls including means for releasably interlocking with complementary means on each associated wall of the other pair of walls;
   means for detachably mounting at least one of said walls to said base;
   a cover;
   first hinge means carried by one of said walls;
   second hinge means carried by said base; and
   third hinge means carried by said cover for engaging said first hinge means to permit hinged attachment of said cover to said wall when said wall is erected on said base and for engaging said second hinge means to permit hinged attachment of said cover to said base when said walls are detached from said base to form a portable housing for the walls.

2. The grill housing of claim 1 in which said means for releasably interlocking includes recess means disposed in said wall and said complementary means includes an insertion portion of the associated wall which is receivable in said recess means.

3. The grill housing of claim 1 in which one of said means for releasably interlocking and complementary means includes recess means disposed in one wall and the other includes an insertion portion of the associated wall which is receivable in said recess means.

4. The grill housing of claim 1 in which each wall includes proximate opposite ends thereof a pair of insertion portions and a pair of recess means disposed for receiving respective insertion portions of each of the walls of the other pair of walls.

5. The grill housing of claim 1 in which one of said means for releasably interlocking and said complementary means includes channel means carried by one said wall and the other includes a section of said associated wall which is slidably receivable by said channel means.

6. The grill housing of claim 1 in which said means for detachably mounting includes at least one pin carried by said wall and at least one complementary aperture disposed on said base, each aperture receiving a respective complementary pin.

7. The grill housing of claim 1 further including latch means for latching said cover in a closed condition to said base.

8. The grill housing of claim 6 further including a handle mounted to the outside of said cover for permitting said cover to be hingeably opened and closed and for enabling carrying of said portable housing when said cover is closed and latched to said base.

9. The grill housing of claim 1 in which at least one set of opposite walls includes means for supporting one or more racks.

10. The grill housing of claim 1 in which one of said base and said walls includes an opening for disposing a fuel conduit therethrough.

11. A portable grill comprising:
    a housing including a base for supporting a burner thereon; a pair of spaced apart front and rear walls; a pair of spaced apart side walls; each wall in each pair of walls including means for releasably interlocking with complementary means on each associated wall of the other pair of walls; means for detachably mounting at least one of said walls to said base; a cover; first hinge means carried by one of said walls; second hinge means carried by said base; and third hinge means carried by said cover for engaging said first hinge means to permit hinged attachment of said cover to said wall when said wall is erected on said base and for engaging said second hinge means to permit hinged attachment of said cover to said base when said walls are detached from said base to form a portable housing for the walls; and
    a collapsible stand, including a plurality of legs, collapsible brace means for interconnecting each pair of adjacent legs, and means for detachably fixing said housing on said legs when said stand is erected, said stand being collapsible when said housing is detached from said legs.

12. The grill of claim 11 in which said means for releasably interlocking includes recess means disposed in said wall and said complementary means includes an insertion portion of the associated wall which is receivable in said recess means.

13. The grill of claim 11 in which one of said means for releasably interlocking and complementary means includes recess means disposed in one wall and the other includes an insertion portion of the associated wall which is receivable in said recess means.

14. The grill of claim 11 in which one of said means for releasably interlocking and said complementary means includes channel means carried by one said wall and the other includes a section of said associated wall which is slidably receivable by said channel means.

15. The grill of claim 11 further including latch means for latching said cover in a closed condition to said base.

16. The grill of claim 11 further including a handle mounted to the outside of said cover for permitting said cover to be hingeably opened and closed and for enabling carrying of said portable housing when said cover is closed and latched to said base.

17. The grill of claim 11 in which at least one set of opposite walls includes means for supporting one or more racks.

18. The grill of claim 11 in which one of said base and said walls includes an opening for disposing a fuel conduit therethrough.

19. The grill of claim 11 in which said means for detachably mounting includes at least one pin carried by said wall and at least one complementary aperture disposed on said base, each aperture receiving a respective complementary pin.

20. The grill of claim 19 in which said means for detachably fixing includes receptacle means disposed at the top of each leg for aligning with an associated aperture and receiving the pin which extends therethrough.

21. A portable gas grill comprising:
gas burner means;
a housing including a base for supporting said burner means thereon; a pair of spaced apart front and rear walls; a pair of spaced apart side walls; each wall in each pair of walls including means for releasably interlocking with complementary means on each associated wall of the other pair of walls; means for detachably mounting at least one of said walls to said base; a cover; first hinge means carried by one of said walls; second hinge means carried by said base; and third hinge means carried by said cover for engaging said first hinge means to permit hinged attachment of said cover to said wall when said wall is erected on said base and for engaging said second hinge means to permit hinged attachment of said cover to said base when said walls are detached from said base to form a portable housing for the walls; and
a collapsible stand, including a plurality of legs, collapsible brace means for interconnecting each pair of adjacent legs, and means for detachably fixing said housing on said legs when said stand is erected, said stand being collapsible when said housing is detached from said legs.

22. The grill of claim 21 in which said means for releasably interlocking includes recess means disposed in said wall and said complementary means includes an insertion portion of the associated wall which is receivable in said recess means.

23. The grill of claim 21 in which one of said means for releasably interlocking and complementary means includes recess means disposed in one wall and the other includes an insertion portion of the associated wall which is receivable in said recess means.

24. The grill of claim 21 in which one of said means for releasably interlocking and said complementary means includes channel means carried by one said wall and the other includes a section of said associated wall which is slidably receivable by said channel means.

25. The grill of claim 21 in which said means for detachably mounting includes at least one pin carried by said wall and at least one complementary aperture disposed on said base, each aperture receiving a respective complementary pair.

26. The grill of claim 25 in which said means for detachably mounting said legs to said housing includes a receptacle means disposed at the top of each leg for aligning with an associated aperture and receiving the pin which extends therethrough.

27. The grill of claim 21 in which at least a pair of opposite walls includes means for supporting one or more racks within said housing.

28. The grill of claim 21 in which one of said base and said walls inlcudes an opening and further including conduit means disposed through said opening and interconnecting a gas supply to said burner for conducting gas from the gas supply to the burner.

* * * * *